United States Patent
Lenzen

(10) Patent No.: US 9,321,916 B2
(45) Date of Patent: Apr. 26, 2016

(54) PLASTIC STRAPPING BAND FOR WRAPPING AN OBJECT AND OF METHOD OF MAKING THE BAND

(71) Applicant: Peter Wilhelm Lenzen, Sprockhoevel (DE)

(72) Inventor: Peter Wilhelm Lenzen, Sprockhoevel (DE)

(73) Assignee: TITAN UMREIFUNGSTECHNIK GMBH & CO. KG, Schwelm (DE)

( * ) Notice: Subject to any disclaimer, the term of this patent is extended or adjusted under 35 U.S.C. 154(b) by 0 days.

(21) Appl. No.: 14/380,072

(22) PCT Filed: Sep. 28, 2012

(86) PCT No.: PCT/EP2012/069237
§ 371 (c)(1),
(2) Date: Aug. 21, 2014

(87) PCT Pub. No.: WO2013/135315
PCT Pub. Date: Sep. 19, 2013

(65) Prior Publication Data
US 2015/0031803 A1    Jan. 29, 2015

(30) Foreign Application Priority Data

Mar. 14, 2012 (DE) .......................... 10 2012 102 155

(51) Int. Cl.
| | |
|---|---|
| *B65D 63/10* | (2006.01) |
| *C08L 67/02* | (2006.01) |
| *B29C 55/06* | (2006.01) |
| *B29C 47/00* | (2006.01) |

(Continued)

(52) U.S. Cl.
CPC ............. *C08L 67/02* (2013.01); *B29C 47/0004* (2013.01); *B29C 47/0021* (2013.01); *B29C 47/0057* (2013.01); *B29C 55/06* (2013.01); *B65D 63/10* (2013.01); *C08J 5/04* (2013.01); *C08J 5/18* (2013.01); *B29K 2023/00* (2013.01); *B29K 2067/00* (2013.01); *B29K 2067/003* (2013.01);

(Continued)

(58) Field of Classification Search
CPC ......... C08L 67/00; C08L 67/02; B65D 63/00; B65D 63/10
USPC ............ 525/445, 437; 524/13, 494, 495, 496, 524/847
See application file for complete search history.

(56) References Cited

U.S. PATENT DOCUMENTS

| | | | | |
|---|---|---|---|---|
| 4,022,863 | A | * | 5/1977 | Karass .................. B29C 55/065 24/16 R |
| 4,130,686 | A | * | 12/1978 | Takahashi .............. B65D 63/10 24/16 PB |
| 4,451,422 | A | | 5/1984 | Yui |
| 4,830,188 | A | | 5/1989 | Hannigan |
| 5,006,385 | A | | 4/1991 | Cheung |

(Continued)

FOREIGN PATENT DOCUMENTS

| | | | | |
|---|---|---|---|---|
| EP | 481471 | A | | 4/1992 |
| GB | 1099477 | B | | 1/1968 |
| GB | 1132060 | | * | 10/1968 ............... B29D 7/24 |
| GB | 1132060 | B | | 10/1968 |
| JP | 58-045951 | | * | 3/1983 .............. B32B 27/36 |

(Continued)

OTHER PUBLICATIONS

Ono et al. (JP 58-045951) Mar. 17, 1983; translation in English.*

*Primary Examiner* — Rip A Lee
(74) *Attorney, Agent, or Firm* — Andrew Wilford

(57) ABSTRACT

The present invention relates to a plastics-material strapping band (4) for wrapping around one or more articles. The plastics-material strapping band has the following constituent parts: a) up to approximately 90% by weight polyester, b) approximately 1% by weight to 5% by weight polyolefin and c) approximately 5% by weight to 10% by weight fiber material. The invention also relates to a method for producing a plastics-material strapping band.

7 Claims, 1 Drawing Sheet

(51) Int. Cl.
  *C08J 5/04* (2006.01)
  *C08J 5/18* (2006.01)
  *B29K 23/00* (2006.01)
  *B29K 67/00* (2006.01)
  *B29K 105/12* (2006.01)
  *B29K 105/00* (2006.01)
  *B29L 7/00* (2006.01)

(52) U.S. Cl.
  CPC ..... *B29K 2105/0088* (2013.01); *B29K 2105/12* (2013.01); *B29L 2007/007* (2013.01); *C08J 2367/02* (2013.01); *C08J 2401/02* (2013.01); *C08J 2421/00* (2013.01); *C08J 2423/06* (2013.01); *C08J 2423/12* (2013.01)

(56) References Cited

U.S. PATENT DOCUMENTS

| | | | |
|---|---|---|---|
| 5,087,306 A | 2/1992 | Cheung | |
| 5,525,391 A * | 6/1996 | Dipede | B29C 47/0021 428/192 |
| 6,210,769 B1 * | 4/2001 | DiPede | B29C 47/0038 428/192 |
| 7,625,628 B2 * | 12/2009 | Rigney et al. | 428/212 |
| 7,943,699 B2 * | 5/2011 | Rolland | C08J 5/18 162/157.4 |
| 8,304,495 B1 * | 11/2012 | Fan | C08L 67/02 428/35.7 |
| 2006/0142488 A1 * | 6/2006 | Alms | C08L 67/02 525/165 |
| 2013/0189461 A1 * | 7/2013 | Bashir | B29C 55/06 428/35.5 |
| 2014/0249275 A1 * | 9/2014 | Tohill | 525/166 |

FOREIGN PATENT DOCUMENTS

| | | |
|---|---|---|
| JP | 11245290 B | 9/1999 |
| JP | 2008254557 B | 10/2008 |

* cited by examiner

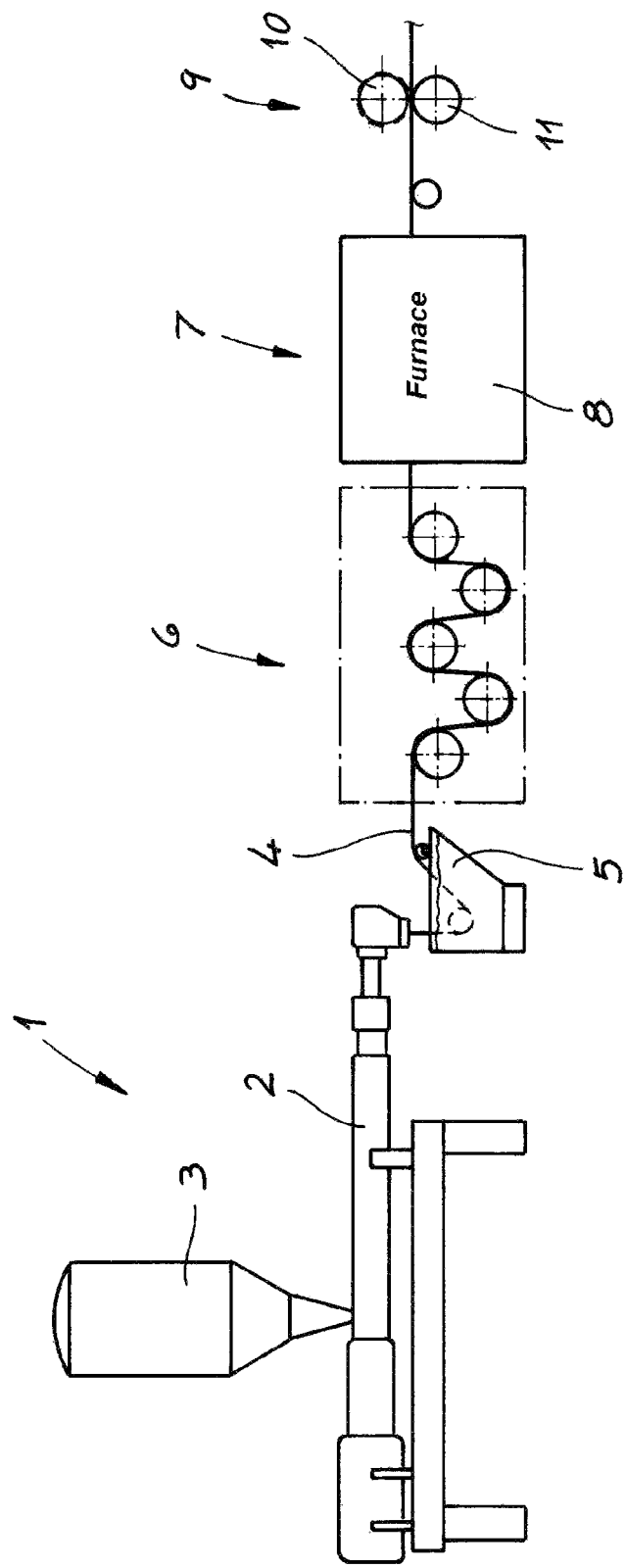

PLASTIC STRAPPING BAND FOR WRAPPING AN OBJECT AND OF METHOD OF MAKING THE BAND

CROSS REFERENCE TO RELATED APPLICATIONS

This application is the US-national stage of PCT application PCT/EP2012/069237 filed 28 Sep. 2012 and claiming the priority of German patent application 102012102155.4 itself filed 14 Mar. 2012.

FIELD OF THE INVENTION

The invention relates to plastic strapping for wrapping around one or several objects.

BACKGROUND OF THE INVENTION

In the past, strapping is predominantly made of steel and used, for example, to join metal coils, to fasten packaging items to a palette, etc. In practice, plastic strapping is increasingly used in addition to such steel strapping.

Thus, DE 1 099 047 describes a tensioning band with high tensile strength, consisting of a homogenous extruded axially oriented polymeric material. Such plastic strapping offer an advantage compared to steel strapping, because the associated packaging will not be cut and the joining of the ends can be done easily by using, for example, friction welding. However, plastic strapping is not suitable to high temperatures.

Thermal welding is described in DE 40 07 560 [U.S. Pat. No. 5,006,385], among others. Moreover, this document in general deals with the possibility of cutting out individual plastic strapping strips from plastic strapping material. For this purpose, the plastic strapping material is produced as film material, cut into bands and subsequently subjected to stretching to achieve planar alignment of the micro-molecular chains.

In addition, it is of course also possible to produce the plastic strapping directly using extrusion, as described, for example, in WO 2003/087200 [U.S. Pat. No. 7,625,628]. Moreover, plastic strapping is described here that is substantially comprised of polyester and a polyolefin that is not chemically modified.

As a result strapping produced in this manner should have increased resistance to longitudinal splitting. The effect described above nevertheless comes with the disadvantage that the temperature stability of the known plastic strapping has been compromised in certain ways. This can be attributed to the mixture of the main component polyester with polyolefin and for example polypropylene, because the melting point of polyester is about 270° C., whereas the melting point for polypropylene was observed to be 130° C. Thus, the known plastic strapping cannot be used to wrap objects whose temperature is in the previously mentioned range during the strapping procedure. Moreover, there is the further disadvantage with known plastic strapping that the temperature of previously used welding pliers must be adjusted to join the ends in certain circumstances, which reduces acceptance of the relevant band by customers or users.

This fundamental problem also confronts the strapping disclosed in JP 11-245290 A. Actually the strapping in question is produced from raw materials containing up to 60% polyester by weight or more. In addition, elastomers such as for example polyolefin can be added, and at a weighted proportion of from one to twenty parts. Moreover, the further addition of, for example, flame retardants, stabilizers, coloring agents, etc. is mentioned. However, these measures have changed nothing with regard to the lack of temperature stability or the continued inadequate strength for certain uses.

GB 1,132,060 describes plastic strapping that is also concerned with increasing the tensile strength. This indeed applies to extruded film strips, from which then individual strapping strips can be cut out. For this purpose, GB 1,132,060 teaches, for a plastic band with a polyolefin base, the use of 1 to 30% by weight of fibrous material relative to the total mass. In this case, the fibrous material is oriented longitudinally. Such a method thus cannot be used in the production of individual strapping material, because the width of such individual bands is typically 20 to 30 mm with a thickness of up to 1 mm or up to 1.5 mm.

The production of individual strips out of film or filmstrips corresponding to GB 1,132,060 is disadvantageous because the film strips can hardly be produced with a consistently similar material thickness. In addition, there is a concern about inhomogeneities when fibers are added in. It is especially important to keep the material thickness as consistent as possible so that the ends of the plastic bands can be securely attached together. For this purpose, one usually resorts to the previously mentioned welding pliers or welding tongs and hence works with a plastic welding process or a friction welded joint. In both cases, variations in the material thickness of the individual strapping produced cause these not to be connected along the entire surface in the closure area, hence the closure may rupture.

OBJECT OF THE INVENTION

The object of the invention is to make provide plastic strapping that distinguishes itself with an increased temperature stability and also as much strength as possible. Moreover, the strapping should be produced as dimensionally stable as possible, so that compared to the previous method the closure has more strength.

SUMMARY OF THE INVENTION

This object is attained according to the invention with plastic strapping for wrapping around one or several objects with the following components:
a) up to about 90% polyester by weight;
b) about 1% to 5% polyolefin by weight; and
c) about 5 to 10% fibrous material by weight.

The above-mentioned components a) to c) for the plastic strapping are the main components, among which in certain circumstance unavoidable contamination or other components may appear, which in total however do not make up more than 1% by weight of the plastic strapping (dry) in question.

Moreover, the indication "about" in the weight specification conveys that the determination of individual components is typically done with the help of differential scanning calorimetry (DSC). For the previously mentioned procedure, its use and its characteristics, specific reference is made to the textbook "Differential Scanning Calorimetry—An Introduction for Practitioners" by the authors Höhne, Hemminger and Flammersheim (Springer-publishing in Berlin, 1996). At any rate dynamic differential calorimetry is associated with systemic uncertainties in determining the respective weight proportion that is expressed by "about."

The plastic strapping according to the invention is as a rule a so-called individual strapping, that is, the plastic strapping in question is directly extruded in the necessary width and material thickness and not for example produced by cutting a sheet.

The plastic strapping according to the invention is thus designed as a single strapping strip. The strapping or individual strapping strip has in this context typically a width or material width of 2 mm to 40 mm and preferably a material width of 5 mm to 40 mm. In addition, a material thickness in the range of 0.1 mm to 3 mm was created and preferably a material thickness of 0.3 mm to 2 mm. Usually at this point material thicknesses of up to 1.2 mm are adequate.

The fibrous material used here routinely has a higher melting temperature than components a) and b). That means the melting temperature of the fibers of the fibrous material is significantly above 300° C. This ensures that, even with an increased usage temperature when using the plastic strapping according to the invention the fibers maintain their structure and in particular are able to absorb tensile forces longitudinally from the plastic strapping strip.

As usual the fibers have thin and flexible structures relative to length. The fibers used in the plastic strapping according to the invention primarily absorb (longitudinal) tensile forces and subsequently are used to increase the strength of plastic strapping produced in this way in their longitudinal direction. In this way tensile strengths of at least about 30 kN/cm$^2$ can be reached, in particular of 40 kN/cm$^2$ and more. The fibers of the fibrous material typically have a maximum length of up to 20 mm and especially 10 mm. Their diameter may be in the range of up to a maximum of 1 mm and preferably 0.5 mm and less settled. Usually the diameter is at a maximum 0.1 mm up to in certain circumstances a maximum of 0.2 mm.

In this way, the fibers can be easily embedded in the plastic material and are also moveable therein at least during the production process. This is the case even when plastic material or the individual strips according to the invention, that is the individual strapping strips have a thickness of only about 1 to 2 mm. The movability of the fibers mentioned above is required, because the extruded plastic strapping strip or plastic strapping material according to the invention is stretched, so that not only does molecular orientation takes place in the plastic material or plastic matrix, but the fibers from the fibrous material are also oriented. Both the molecular orientation as well as that of the fibers thus takes place longitudinally of the plastic strapping according to the invention to achieve the described and specified strengths.

Related to the fact that the plastic matrix to accommodate the fiber material is mainly comprised of polyester and polyolefin, plastic strapping strip is produced that not only has significant strength values longitudinally, but also is not prone to breaking or splitting longitudinally when under tension. This can essentially be attributed to the fact that the polymer chains of the primarily used (up to 90% by weight) polyesters are laterally joined by the additional use of polyolefin with the specified weight ratio of about 1 to 5% by weight Even a small proportion of approximately 1% by weight of polyolefin already provides for such a link among the individual polyester chains. The more polyolefin is used, the more marked is this effect, while nevertheless about 5% by weight of polyolefin is the upper limit. That means, a larger weight fraction of polyolefin here noticeably reduces the overall strength achieved by the polyester component.

For this reason the proportion of polyolefins cannot be regularly increased or can only be compensated if the high weight proportions of polyolefin in the invention are not only balanced corresponding to the loss of strength due to polyolefin but are overcompensated by additionally added fibrous material. Consequently the plastic strapping according to the invention combines the advantages of a known plastic band of polyester/polyolefin in that it prevents fanning out and in that strength is increased even more compared to the known band.

As a result the plastic strapping according to the invention is predestined for use of recycling materials. Indeed, recycling materials in part come from PET bottles that can be processed into PET flakes, as is primarily described in U.S. Pat. No. 4,830,188. Such PET Flakes typically consist of predominantly polyester and partially of one or more polyolefins together. Within the scope of the invention such PET flakes can then be used advantageously for the production of a plastic strapping strip, so that, depending on the starting composition of the PET flakes, additives should be considered and especially within the context of the invention fibrous material c) in the concentration specified is mixed into the extrudate prior to extrusion. The weight ranges provided in the context of feature c) of from about 5 to 10% by weight of fibrous material is arrived at because a certain proportion of fibers is fundamentally required in order to noticeably improve the rigidity longitudinally overall, as described. Typically it has been found that even 5% by weight of fibrous material brings improvement.

Strength can of course not be increased without limit, because otherwise the fibers incorporated in the plastic matrix during the necessary stretching procedure can no longer be easily aligned longitudinally of the plastic strapping strip.

Here about 10% by weight of fibrous material has emerged as the upper limit of what is still practical, because such a weight percentage still provides the necessary movability of the individual fibers during the described stretching procedure.

In an advantageous embodiment of the invention the proportion of polyester is 85% to 90% by weight and is especially about 90% by weight. Higher percentages of polyester are not necessary in view of the addition of fibrous material. Rather, the added fibers here provide for a significant increase in strength in the polyester raw materials, even in the presence of polyolefin.

The polyolefin used may in principle be polyethylene, polypropylene, or combinations thereof. In principle, comparable polyolefins are conceivable, as described in detail in the preamble with reference to WO 2003/087200.

Very different materials can be used as fibrous materials. Thus, in principle natural fibers can be used. Such natural fibers include plant fibers that can be used in the invention. Of particular importance are alternatively or additionally used mineral fibers that are used for example in the construction industry with fibrous gypsum. Such mineral fibers describe fibers without organically bound carbons.

Alternatively or in addition to natural fibers as fibrous materials one can also resort to chemical fibers previously called synthetic fibers. In this case special cellulose fibers or rubber fibers from natural polymers have proven beneficial. In addition to such fibers out of natural polymers, fibers from synthetic polymers can also be used, for example, polyamide fibers, aramid fibers, polytetrafluoroethylene fibers, PVC fibers, etc. The prerequisite for these chemical fibers or in general the fibers from the fibrous material and their use in the context of the invention as a rule is that they have a higher melting temperature than the components a) and b) of the plastic strapping according to the invention and usually are equipped with a melting temperature over 300°.

Because of these requirements the use of industrially produced inorganic fibers is preferred. In this case, there are, for example, glass fibers, basalt fibers, carbon fibers or the like. Ceramic fibers can also be considered. Thus, it is understood in all these cases that the fibrous material is combined or can also fundamentally be combined with the previously described and individually displayed fibers.

The plastic strapping strip according to the invention is characterized not only by greater strength compared to the prior art and by increased temperature stability, but an improved relaxation behavior is also observed. This refers to the characteristic of the plastic strapping when it assumes a steady state with decreased tension. It is in fact observed for example that plastic strapping made of polyester loses about 30% of its tension following the wrapping procedure within the first five days at room temperature. Increased temperatures cause the described drop in tension by about 30% to be completed in even fewer than five days.

That means the mechanical tension decreases over time with constant strain, namely in the case of a plastic band made of polyester by about 30% in the example described here. In the present invention it has been found that adding polyolefin and especially by using 5 to 10% by weight of fibrous material positively impacts the relaxation behavior. Indeed, the plastic strapping according to the invention shows a chronological decrease in mechanical tension at constant strain by significantly less than 30%, preferably by only 20% and less and especially by only 10% and less. That means the tension decreases with constant tension according to a particularly preferred embodiment by only a maximum of 10%. Therefore the objects to be wrapped during the wrapping procedure do not need to be wrapped with a strapping strip at as high a tension, as was previously the case. Consequently smaller sized strapping machines can be used and of course less energy is required.

The objects to be wrapped basically include, for example, cans, bricks, bales, etc. that can be attached to tension plates. Of course, other objects can also be wrapped, as needed, with the plastic strapping strip according to the invention.

Finally, it has proven useful to provide the plastic strapping according to the invention on at least one face with embossing. This can be regular structures such as, for example, diamond shapes, etc. This reduces the contact surface of the plastic strapping, for example, when passing through a guide passage, so that there is a reduction in friction. At the same time, the formation of a type of "air cushion" is observed that further simplifies and improves transportation of the plastic strapping according to the invention through the strip-guide passage.

Moreover, certain specific characteristics of the plastic strapping in question may be positively influenced by such embossing or printing. This applies particularly to the rigidity of the band in question, so that implementation of such embossing or printing allows for a reduction of the band cross section. This leads to decreased production costs. The embossing or printing described can be incorporated with one or more embossing rollers, as will be explained below in more detail.

In fact, as a whole, synergistic effects were observed between the embossing on the one hand and the fibrous material and the combination of polyester and polyolefin in the plastic strapping on the other hand. Because the combination of polyester/polyolefin already results in increased strength and means that strapping produced in this way and especially a single strapping strip is not split or fanned out longitudinally (see WO 2003/087200).

The addition of fibers or fibrous material in the indicated weight composition additionally and on the one hand ensures that the plastic strapping so produced can be used at elevated operating temperatures, and on the other hand the fibers retain the structure that according to the invention for the entire plastic strapping. That means that the strapping according to the invention is characterized by high dimensional stability even at increased temperatures. As a result the ends of the plastic strapping strip according to the invention can be properly joined to each other thermally, and in a good surface bond, so that increased strength is observed in comparison to the prior art at this point. Moreover, the increased dimensional stability helps, compared to the known prior art, to significantly reduce damage to the plastic strapping in use.

Finally the embossing favors guiding the plastic strapping according to the invention through the strip-guide passage on the one hand and on the other enables further reduction in the material thickness compared to strapping without embossing. That means both the embossing and the incorporated fibrous material increase the strength of the plastic strapping according to the invention with the related ability to decrease the consistent material thickness. In this way there is an observed decrease in the use of raw materials that is in the double digits percentage.

In addition, the embossing takes place at the end of production of the plastic strapping according to the invention when the embedded fibers are not or are barely movable within the plastic material. This way the additional embossing step provides an additional and desired compaction of the fibers inside the plastic strapping. This again increases the strength.

In the below-described embodiment a system for making plastic strapping according to the invention is explained in more detail.

BRIEF DESCRIPTION OF THE DRAWING

The single schematic view shows a device for making plastic strapping for wrapping around one or several objects.

SPECIFIC DESCRIPTION OF THE INVENTION

First, the view shows an extruding apparatus 1 equipped with an extruder 2 and a supply hopper 3. The supply 3 holds the raw materials for making plastic strapping 4 that emerges at the output end of the extruder 2 and is supplied to the extruder 2. Consequently the supply 3 contains the extrudate.

After extrusion at the output end of the extruder 2, the plastic strapping 4 first passes through a water bath 5. Following the water bath 5 there is an upstream stretcher 6 and a second stretcher 7. The downstream stretcher 7 is in addition equipped with a furnace 8, through which the plastic strapping 4 is passed during the downstream stretching operation. With regard to stretching, the plastic strapping 4 exiting the extruder 2 is generally stretched at stretch ratio of 1:2 to 1:5 and in particular 1:4. That means that the plastic strapping exiting extruder 2 is stretched to between two and five times its length in the upstream or downstream stretcher 6, 7.

The furnace 8 with the downstream stretcher 7 ensures that the molecular orientation of the polymer chains achieved during material stretching remains unchanged as well as that the orientation of the fibers does not disappear or dissolve after the stretching procedure ends. After passing through the two stretchers 6 and 7 the plastic strapping 4 is embossed. For this purpose, an embosser 9 is provided that is equipped with a roller 10 and a counter or counter pressure roller 11 that interacts with the embossing roller 10.

With the assistance of the embosser 9 the plastic strapping 4 is provided on at least one face longitudinally with embossing and/or printing. For this purpose the embossing roller 10 has an elevated temperature of for example 50° C. to 60° C., more than the ambient temperature, and is equipped with a corresponding surface contour according to the desired embossing. In this way not only can the contact surface of the plastic strapping be significantly reduced for example with a guide groove as compared to a smooth-face system, reducing friction as a result, but the previously mentioned "air cushion effect" can also be used when transporting the plastic strapping.

In addition, the embossing incorporated in the transverse direction of the plastic strapping increase its rigidity as a whole. Thus the band cross section can be reduced while maintaining the same rigidity that results in savings of materials.

With the appropriate device the plastic strapping 4 is produced directly, and is thus available in a width of between about 5 mm to about 40 mm. The thickness of the material is about 0.1 mm to 3 mm. Alternatively it is also possible to work with a plastic strapping on the output end of the extruding device 1 of the described specification. The plastic strapping material can be cut longitudinally upstream of the stretchers 6 and 7 into individual plastic strapping strips 4 that however are not shown.

The invention claimed is:

1. Plastic strapping for wrapping around one or several objects, the strapping consisting essentially of the following components:
    a) up to about 90% polyester by weight,
    b) about 1 to 5% polyolefin by weight and
    c) about 5 to 10% cellulose fibers or rubber fibers from natural polymers by weight, the strapping being stretched and having a face that is embossed.

2. The plastic strapping according to claim 1, wherein the cellulose fibers or rubber fibers from natural polymers of component c) have a higher melting temperature than the components a) and b).

3. The plastic strapping according to claim 1, wherein the proportion of polyester of component a) is about 85% to 90% weight.

4. The plastic strapping according to claim 1, wherein the polyolefin is polyethylene, polypropylene or combinations thereof.

5. The plastic strapping according to claim 1, wherein the cellulose fibers or rubber fibers from natural polymers of component c) have a maximal length of up to 20 mm.

6. The plastic strapping according to claim 1, wherein natural plant fibers are used as the cellulose fibers of component c).

7. A method of making plastic strapping as defined in claim 1, comprising the steps of:
    mixing the components a) to c) with each other;
    coextruding the mixed components to make a plastic strapping preform; and subsequently
    stretching the resulting plastic strapping preform at a stretch ratio from 1:2 up to 1:5; and
    embossing a face of the plastic strapping preform.

* * * * *